US011412759B1

(12) United States Patent
Manchuliantsau

(10) Patent No.: US 11,412,759 B1
(45) Date of Patent: Aug. 16, 2022

(54) METHOD FOR MANUFACTURING ALTERNATIVE MEAT FROM LIQUID SPENT BREWERS' YEAST

(71) Applicant: USARIUM INC., San Francisco, CA (US)

(72) Inventor: Aleh Manchuliantsau, San Francisco, CA (US)

(73) Assignee: USARIUM INC., San Francisco, CA (US)

( * ) Notice: Subject to any disclaimer, the term of this patent is extended or adjusted under 35 U.S.C. 154(b) by 0 days.

(21) Appl. No.: 17/572,036

(22) Filed: Jan. 10, 2022

Related U.S. Application Data

(63) Continuation of application No. 17/474,075, filed on Sep. 14, 2021.

(60) Provisional application No. 63/221,755, filed on Jul. 14, 2021, provisional application No. 63/221,755, filed on Jul. 14, 2021.

(51) Int. Cl.
*A23J 1/18* (2006.01)
*A23L 31/10* (2016.01)
*A23J 3/26* (2006.01)
*A23J 3/22* (2006.01)

(52) U.S. Cl.
CPC ............ *A23J 1/18* (2013.01); *A23J 3/227* (2013.01); *A23J 3/26* (2013.01); *A23L 31/10* (2016.08); *A23V 2002/00* (2013.01)

(58) Field of Classification Search
CPC ...... A23J 1/18; A23J 3/227; A23J 3/26; A23L 31/10; A23V 2002/00
USPC ..................................... 426/49, 62
See application file for complete search history.

(56) References Cited

U.S. PATENT DOCUMENTS

| | | |
|---|---|---|
| 2,162,729 A | 6/1939 | Levinson et al. |
| 2,235,613 A | 3/1941 | Grelck |
| 2,881,076 A | 4/1959 | Sair |
| 3,142,571 A | 7/1964 | McAnelly et al. |
| 3,527,642 A | 9/1970 | Harrison et al. |
| 3,586,662 A | 6/1971 | O'Connor |
| 3,723,131 A | 3/1973 | Bixby et al. |
| 3,754,926 A * | 8/1973 | Strommer ............ A23J 3/26 426/453 |
| 3,761,353 A | 9/1973 | Noe et al. |
| 3,787,583 A | 1/1974 | Hruby |
| 3,861,293 A | 1/1975 | Buffa et al. |
| 3,891,774 A | 6/1975 | Baker et al. |
| 3,904,769 A | 9/1975 | Sair et al. |
| 3,908,025 A | 9/1975 | Miller |
| 3,911,147 A | 10/1975 | Barham et al. |
| 3,950,564 A | 4/1976 | Puski et al. |
| 3,966,971 A | 6/1976 | Morehouse et al. |
| 3,971,306 A | 7/1976 | Wiese et al. |
| 4,024,286 A | 5/1977 | Cornelius et al. |
| 4,052,516 A | 10/1977 | Mitchell |
| 4,088,795 A | 5/1978 | Goodnight, Jr. et al. |
| 4,185,123 A | 1/1980 | Wenger et al. |
| 4,212,799 A | 7/1980 | Nuzzolo et al. |
| 4,310,558 A | 1/1982 | Nahm, Jr. |
| 4,315,034 A | 2/1982 | Levinson et al. |
| 4,423,082 A | 12/1983 | Bauernfeind et al. |
| 4,435,319 A | 3/1984 | Pearce |
| 4,454,804 A | 6/1984 | McCulloch |
| 4,505,936 A | 3/1985 | Meyers et al. |
| 4,515,818 A | 5/1985 | MacDonald et al. |
| 4,551,335 A | 11/1985 | Canella et al. |
| 4,794,011 A | 12/1988 | Schumacher |
| 4,901,635 A | 2/1990 | Williams |
| 4,937,085 A | 6/1990 | Cherry et al. |
| 4,973,490 A | 11/1990 | Holmes |
| 5,097,017 A | 3/1992 | Konwinski |
| 5,270,062 A | 12/1993 | Buchs |
| 5,296,253 A | 3/1994 | Lusas et al. |
| 5,328,562 A | 7/1994 | Rafferty et al. |
| 5,346,714 A | 9/1994 | Peters |
| 5,391,384 A | 2/1995 | Mazza |
| 5,436,023 A | 7/1995 | Avera |
| 5,685,218 A | 11/1997 | Kemper |
| 5,702,746 A | 12/1997 | Wiik |
| 5,725,902 A | 3/1998 | Lesueur-Brymer et al. |
| 5,888,307 A | 3/1999 | Solheim |
| 5,912,034 A | 6/1999 | Martin et al. |

(Continued)

FOREIGN PATENT DOCUMENTS

| | | |
|---|---|---|
| BY | 10488 C1 | 4/2008 |
| CA | 968214 A | 5/1975 |

(Continued)

OTHER PUBLICATIONS

Gibson et al. Can. Inst. Food Technol. J. 3: 113-115 (Year: 1970).*
Gibson, D.; Dwivedi, B. Production of Meat Substitutes from Spent Brewers' Yeast and Soy Protein, Can. Inst. Food Technol. J. 1970, 3, 113-115.
Dietary Guidelines for Americans, Ninth edition, 2020, available at https://www.dietaryguidelines.gov.
USDA Food Availability (Per Capita) Data System, 2021, available at https://www.ers.usda.gov/data-products/food-availability-per-capita-data-system/.
J.C. Edozien et al., Effects of high levels of yeast feeding on uric acid metabolism of young men, Nature vol. 228, Oct. 10, 1970, p. 180.

(Continued)

*Primary Examiner* — Hamid R Badr
(74) *Attorney, Agent, or Firm* — K&L Gates LLP

(57) ABSTRACT

Method of manufacturing food products from a material comprising liquid spent brewers yeast is provided herein. A method for processing liquid spent brewers' yeast as the primary ingredient and at least one secondary protein ingredient into food products suitable for safe human consumption comprises subjecting a mix of primary and secondary ingredients to heat treatment at elevated pressure. The resulting product has a meaty flavor and texture, and a reduced RNA content. The process uses ingredients in their native liquid form, skipping drying and isolation, which reduces waste and is cost-effective.

14 Claims, 2 Drawing Sheets

(56) References Cited

U.S. PATENT DOCUMENTS

| | | | |
|---|---|---|---|
| 5,976,387 | A | 11/1999 | Higo et al. |
| 5,976,594 | A | 11/1999 | LaFollette |
| 6,039,999 | A | 3/2000 | Bakshi et al. |
| 6,045,851 | A | 4/2000 | Cross |
| 6,132,791 | A | 10/2000 | Fox |
| 6,165,349 | A | 12/2000 | Madar |
| 6,197,081 | B1 | 3/2001 | Schmidt |
| 6,534,105 | B2 | 3/2003 | Kartchner |
| 6,635,301 | B1 | 10/2003 | Howsam |
| 6,800,308 | B2 | 10/2004 | Maenz et al. |
| 6,905,600 | B2 | 6/2005 | Lee, Jr. |
| 6,955,831 | B2 | 10/2005 | Higgs et al. |
| 7,575,771 | B2 | 8/2009 | Ciantar et al. |
| 7,771,699 | B2 | 8/2010 | Adams et al. |
| 7,932,065 | B2 | 4/2011 | Medoff |
| 7,968,760 | B2 | 6/2011 | Lee, Jr. |
| 7,989,011 | B2 | 8/2011 | Newkirk et al. |
| 7,989,592 | B2 | 8/2011 | Ganjyal et al. |
| 8,017,171 | B2 | 9/2011 | Sample |
| 8,017,820 | B2 | 9/2011 | Foody et al. |
| 8,048,652 | B2 | 11/2011 | Fichtali et al. |
| 8,057,639 | B2 | 11/2011 | Pschorn et al. |
| 8,133,393 | B2 | 3/2012 | Stuart |
| 8,192,769 | B2 | 6/2012 | Wester et al. |
| 8,278,081 | B2 | 10/2012 | Schmidt |
| 8,293,297 | B2 | 10/2012 | Orcutt et al. |
| 8,365,433 | B2 | 2/2013 | Orura |
| 8,372,464 | B2 | 2/2013 | Dierking et al. |
| 8,415,122 | B2 | 4/2013 | Medoff et al. |
| 8,481,677 | B2 | 7/2013 | Barrows et al. |
| 8,506,716 | B2 | 8/2013 | Ahring et al. |
| 8,529,976 | B2 | 9/2013 | McMindes et al. |
| 8,603,558 | B1 | 12/2013 | Almutairi |
| 8,642,109 | B2 | 2/2014 | Baumer et al. |
| 8,685,485 | B2 | 4/2014 | McMindes et al. |
| 8,728,542 | B2 | 5/2014 | Pickardt et al. |
| 8,735,544 | B1 | 5/2014 | Prevost et al. |
| 8,820,328 | B2 | 9/2014 | Ehling et al. |
| 8,945,352 | B2 | 2/2015 | Medoff |
| 8,951,778 | B2 | 2/2015 | Medoff et al. |
| 8,986,774 | B2 | 3/2015 | Ganjyal |
| 9,084,948 | B2 | 7/2015 | Mazza et al. |
| 9,109,180 | B2 | 8/2015 | Wolf et al. |
| 9,125,962 | B2 | 9/2015 | Michalek et al. |
| 9,179,692 | B2 | 11/2015 | Trass et al. |
| 9,206,453 | B2 | 12/2015 | Medoff et al. |
| 9,259,017 | B2 | 2/2016 | Dhalleine et al. |
| 9,370,200 | B2 | 6/2016 | Gibbons et al. |
| 9,856,601 | B2 | 1/2018 | Stromberg |
| 9,878,355 | B2 | 1/2018 | Norris et al. |
| 9,907,322 | B2 | 3/2018 | McMindes et al. |
| 10,039,306 | B2 | 8/2018 | Vrljic et al. |
| 10,051,878 | B2 | 8/2018 | Helling et al. |
| 10,172,380 | B2 | 1/2019 | Varadan et al. |
| 10,214,751 | B2 | 2/2019 | Nilsen et al. |
| 10,264,805 | B2 | 4/2019 | Spinelli et al. |
| 10,299,500 | B2 | 5/2019 | Passe et al. |
| 10,344,342 | B2 | 7/2019 | Kusuda et al. |
| 10,550,352 | B2 | 2/2020 | Hewitt et al. |
| 10,645,950 | B2 | 5/2020 | Manchuliantsau et al. |
| 2002/0155206 | A1 | 10/2002 | Orlando |
| 2002/0174780 | A1 | 11/2002 | Clifford |
| 2003/0064145 | A1 | 4/2003 | Fannon |
| 2004/0067289 | A1 | 4/2004 | Tricoit et al. |
| 2004/0081742 | A1 | 4/2004 | Levi et al. |
| 2004/0185148 | A1 | 9/2004 | Said |
| 2004/0202771 | A1 | 10/2004 | Lee |
| 2004/0224065 | A1 | 11/2004 | Markham et al. |
| 2004/0237859 | A1 | 12/2004 | Hartmann |
| 2005/0095346 | A1 | 5/2005 | Borders et al. |
| 2005/0136162 | A1 | 6/2005 | Kvist et al. |
| 2005/0249860 | A1 | 11/2005 | Konecsni et al. |
| 2006/0040022 | A1 | 2/2006 | Bouraoui |
| 2006/0093718 | A1 | 5/2006 | Jurkovich et al. |
| 2006/0216397 | A1 | 9/2006 | Kerkman |
| 2007/0014896 | A1 | 1/2007 | Wong et al. |
| 2007/0087107 | A1 | 4/2007 | Borders et al. |
| 2007/0092616 | A1 | 4/2007 | Witte et al. |
| 2007/0172540 | A1 | 7/2007 | Neece et al. |
| 2007/0269580 | A1 | 11/2007 | Werstak |
| 2008/0008815 | A1 | 1/2008 | Cho |
| 2008/0008816 | A1 | 1/2008 | Singh et al. |
| 2008/0008817 | A1 | 1/2008 | Singh et al. |
| 2008/0008820 | A1 | 1/2008 | Singh et al. |
| 2008/0138495 | A1 | 6/2008 | Barraclough et al. |
| 2008/0160132 | A1 | 7/2008 | Silver et al. |
| 2008/0233266 | A1 | 9/2008 | Boerboom |
| 2009/0053800 | A1 | 2/2009 | Friend et al. |
| 2009/0155444 | A1 | 6/2009 | Yakubu et al. |
| 2009/0155447 | A1 | 6/2009 | Moore et al. |
| 2009/0155448 | A1 | 6/2009 | Solorio et al. |
| 2010/0021609 | A1 | 1/2010 | Mattson et al. |
| 2010/0112136 | A1 | 5/2010 | Ward et al. |
| 2010/0166940 | A1 | 7/2010 | MeMindes et al. |
| 2011/0027433 | A1 | 2/2011 | Ruf et al. |
| 2011/0081689 | A1 | 4/2011 | Flanegan et al. |
| 2011/0172142 | A1 | 7/2011 | Smith et al. |
| 2011/0212239 | A1 | 9/2011 | Carin et al. |
| 2011/0309559 | A1 | 12/2011 | Franke et al. |
| 2011/0311599 | A1 | 12/2011 | Boursier et al. |
| 2012/0093994 | A1 | 4/2012 | Hsieh et al. |
| 2012/0171351 | A1 | 7/2012 | Solorio |
| 2012/0294986 | A1 | 11/2012 | Choromanski et al. |
| 2012/0301598 | A1 | 11/2012 | Karges et al. |
| 2013/0052682 | A1 | 2/2013 | Medoff et al. |
| 2013/0109065 | A1 | 5/2013 | Godfroid et al. |
| 2013/0243904 | A1 | 9/2013 | Cordle et al. |
| 2013/0287909 | A1 | 10/2013 | Lewis et al. |
| 2014/0088330 | A1 | 3/2014 | Powell et al. |
| 2014/0096764 | A1 | 4/2014 | Komplln et al. |
| 2014/0134316 | A1 | 5/2014 | Jincks et al. |
| 2014/0141127 | A1 | 5/2014 | Jincks et al. |
| 2014/0273140 | A1 | 9/2014 | Langhauser |
| 2014/0328984 | A1 | 11/2014 | Legault |
| 2015/0017312 | A1 | 1/2015 | Tegel |
| 2015/0041574 | A1 | 2/2015 | Anderson |
| 2015/0056324 | A1 | 2/2015 | Cecava et al. |
| 2015/0181907 | A1 | 7/2015 | Baumer et al. |
| 2015/0223498 | A1 | 8/2015 | Gu et al. |
| 2015/0250212 | A1 | 9/2015 | Diaz et al. |
| 2015/0367298 | A1 | 12/2015 | Wenger |
| 2016/0017444 | A1 | 1/2016 | Medoff et al. |
| 2016/0108187 | A1 | 4/2016 | Wendeln et al. |
| 2016/0143337 | A1 | 5/2016 | Passe |
| 2016/0295897 | A1 | 10/2016 | Lis et al. |
| 2016/0309743 | A1 | 10/2016 | Spinelli et al. |
| 2016/0360770 | A1 | 12/2016 | Sherlock |
| 2017/0105438 | A1 | 4/2017 | Ajami et al. |
| 2017/0226439 | A1 | 8/2017 | Nguyen et al. |
| 2017/0226535 | A1 | 8/2017 | Tudman |
| 2017/0226695 | A1 | 8/2017 | Rowlands et al. |
| 2017/0280756 | A1 | 10/2017 | Jaramillo Freydell et al. |
| 2017/0303558 | A1 | 10/2017 | Eisner et al. |
| 2018/0310590 | A1 | 11/2018 | Manchuliantsau |
| 2018/0327792 | A1 | 11/2018 | Brown et al. |
| 2019/0000120 | A1 | 1/2019 | Hossen et al. |
| 2019/0075820 | A1 | 3/2019 | Redl et al. |
| 2019/0153122 | A1 | 5/2019 | Mateus et al. |
| 2019/0183155 | A1 | 6/2019 | Manchuliantsau |
| 2019/0223475 | A1 | 7/2019 | Manchuliantsau et al. |
| 2019/0223476 | A1 | 7/2019 | Manchuliantsau et al. |
| 2020/0060308 | A1 | 2/2020 | Manchuliantsau et al. |
| 2020/0138055 | A1 | 5/2020 | Schein |
| 2020/0260758 | A1 | 8/2020 | Manchuliantsau et al. |

FOREIGN PATENT DOCUMENTS

| | | |
|---|---|---|
| CA | 1177323 A | 11/1984 |
| CA | 2652384 C | 11/2014 |
| CA | 3014516 A1 | 9/2017 |
| CN | 102742661 A | 10/2012 |
| EP | 0092443 A1 | 10/1983 |
| EP | 0455889 B1 | 3/1995 |
| EP | 2218497 A1 | 8/2010 |

(56) References Cited

FOREIGN PATENT DOCUMENTS

| | | |
|---|---|---|
| EP | 3491931 A1 | 6/2019 |
| GB | 116357 A | 6/1918 |
| KR | 19930019123 A | 10/1993 |
| KR | 100248275 B1 | 3/2000 |
| KR | 100767809 B1 | 10/2007 |
| RU | 2297155 C2 | 4/2007 |
| RU | 2329658 C1 | 7/2008 |
| RU | 2406372 C1 | 12/2010 |
| RU | 2631827 C1 | 9/2017 |
| WO | WO 2009/129320 A2 | 10/2009 |
| WO | WO 2009/134791 A | 11/2009 |
| WO | WO 2010/135679 A1 | 11/2010 |
| WO | WO 2011/107760 A2 | 9/2011 |
| WO | WO 2017/075078 A1 | 5/2017 |
| WO | WO 2019/102248 A1 | 5/2019 |
| WO | WO 2019/106072 A1 | 6/2019 |

OTHER PUBLICATIONS

Marson, G.V.; Saturno, R.P.; Comunian, T.A.; Consoli, L.; Machado, M.T.D.C.; Hubinger, M.D., Maillard conjugates from spent brewer's yeast by-product as an innovative encapsulating material, Food Res. Int. 2020, 136, 109365. ISSN 0963-9969, https://doi.org/10.1016/j.foodres.2020.109365.

Canepa, A.; Pieber, M.; Romero, C.; Tohá, J.C. A method for large reduction of the nucleic acid content of yeast, Biotechnol. Bioeng. 1972, vol. 14, 173-177.

Trevelyan, W.E., Chemical methods for the reduction of the purine content of baker's yeast, a form of single-cell protein, J. Sci. Food Agric. 1976, vol. 27, 225-230.

Jaeger A, Arendt EK, Zannini E, Sahin AW. Brewer's Spent Yeast (BSY), an Underutilized Brewing By-Product. Fermentation. 2020; 6(4):123. https://doi.org/10.3390/fermentation6040123.

ADM, PRO-FAM® 974, Isolated Soy Protein, 066-974, Jun. 26, 2008, 1 page.

Da Graca Costa do Nascimento et al., "Use of sesame oil cake (*Sesamum indicum* L) on corn expanded extrudates", Food Research International, 2012, vol. 45, pp. 434-443.

Sivaramakrishnan et al., "Chapter 13 Edible Oil Cakes", Biotechnology for Agro-Industrial Residues Utilisation, 2009, pp. 253-271.

Suknark et al., "Physical Properties of Directly Expanded Extrudates Formulated from Partially Defatted Peanut Flour and Different Types of Starch", Food Research International, 1997, vol. 30, No. 8, pp. 575-583.

Sokolowska et al., "Characteristics of rapeseed oilcake using nitrogen adsorption", International Agrophysics, 2013, 27, pp. 329-334.

Stein, "Nutritional Value of High Fiber Coproducts from the Copra, Palm Kernel, and Rice Industries in Diets Fed to Pigs", Journal of Animal Science and Biotechnology, 2015, vol. 6, No. 56, 9 pages.

Suttirak et al., "Potential Application of Ascorbic Acid, Citric Acid and Oxalic Acid for Browning Inhibition in Fresh-Cut Fruits and Vegetables", Walailak J Sci & Tech, 2010, vol. 7, No. 1, pp. 5-14.

McEvily et al., "Inhibition of Enzymatic Browning in Foods and Beverages", Critical Reviews in Food Science and Nutrition, 1992, vol. 32. No. 3, 253-273.

Narita et al., "Degradation Kinetics of Chlorogenic Acid at Various pH Values and Effects of Ascorbic Acid and Epigallocatechin Gallate on its Stability under Alkaline Conditions", J. Agric. Food Chem., 2013, vol. 61, pp. 966-972.

Salgado et al., "Sunflower Protein Concentrates and Isolates Prepared from Oil Cakes Have High Water Solubility and Antioxidant Capacity", J Am Oil Chem Soc, 2011, 88, pp. 351-360.

Wong, Jacqueline, "Food Waste Diversion Options Analysis in Pomona, CA", A Thesis presented to the faculty of California State Polytechnic University, Pomona, 2018, 99 pages.

Bhatt et al., "From food waste to value-added surplus products (VASP): Consumer acceptance of a novel food product category", J Consumer Behav., 2017, pp. 1-7.

Pakhomova O.N., "Development and use of a functional food fortifier from rapeseed cake", Thesis for application for academic degree of Ph.D., Orel, 2014. (English abstract included at p. 1—corresponds to Pakhomova O.N., "Development and use of functional rapeseed meal enrichment agent" as cited in the Dec. 5, 2019 International Search Report and Written Opinion of the ISA for International Application No. PCT/US2019/044258).

International Search Report and Written Opinion of the international Searching Authority for International Application No. PCT/US2018/030084 dated Aug. 9, 2018.

Shepon et al., "Energy and protein feed-to-food conversion efficiencies in the US and potential food security gains from dietary changes", Environ. Res. Lett. 11, Oct. 2016, 8 pages.

Rodrigues et al., "increasing the Protein Content of Rapeseed Meal by Enzymatic Hydrolysis of Carbohydrates", BioResources, 9(2), 2014, pp. 2010-2025.

Brugger et al., "Next Generation Texturized Vegetable Proteins", Food Marketing & Technology, Apr. 2017, pp. 20-24.

Brookfield CT3, Texture Analyzer, Operating Instructions, Manual No. M08-372-C0113, Brookfield Engineering Laboratories, Inc., 56 pages.

Vestjens, Laura, MSc Thesis Biobased Chemistry and Technology, Sunflower-based protein fractions for food applications, Wageningen University & Research, Jul. 7, 2017.

Berk, Zeki, Chapter 6: Isolated Soybean Protein, Technology of Production of Edible Flours and Protein Products from Soybeans, FAO Agricultural Services Bulletin No. 97, http://www.fao.org/3/t0532e/t0532e07.htm, accessed Oct. 31, 2019.

Deshpande et al.. "Optimization of a chocolate-flavored, peanut-soy beverage using response surface methodology (RSM) as applied to consumer acceptability data", Swiss Society of Food Science and Technology, 41, 2008, pp. 1485-1492.

Ren et al., "Isolation and Characterization of Sunflower Protein Isolates and Sunflower Globulins", Information Tech, and Agricultural Eng., AISC 134, 2012, pp. 441-449.

Perednya et al., "The Fodder Production's Extrusion Technologies", Vestnik NIIMZh Journal No. 4 (20), 2015, pp. 60-63. (English abstract included at p. 63—corresponds to Perednya V.I. et al. "Extrusion technology in feed production" as cited in the Dec. 5, 2019 International Search Report and Written Opinion of the ISA for international Application No. PCT/US2019/044258).

International Search Report and Written Opinion of the International Searching Authority for International Application No. PCT/US2019/044258 dated Dec. 5, 2019.

Markov. S.A. et al., "Features of Fractions Chemical Compound of Sunflower Oilcakes and Meal at them Reagentless Division",Izvestiia VUZov. Pishchevara Tekhnotogiia, No. 1, 2012, pp. 29-31. (English abstract included at p. 31—corresponds to Markov S.A. et al., "Features of the chemical composition of fractions of sunflower meal and meal during their reagent-free separation" as cited in the Dec. 5, 2019 International Search Report and Written Opinion of the ISA for International Application No. PCT/US2019/044258).

Andrianova E.N., "Chlorogenic Acid and Productivity of Broilers," All-Russian Research and Technological Poultry Institute (VNITIP), No. 9, 2015, pp. 17-21. (English abstract included at p. 17—corresponds to Andrianova cited in the Dec. 5, 2019 International Search Report and Written Opinion of the ISA for International Application No. PCT/US2019/044258).

Meal/WholeSeed Feeding, National Sunflower Association, accessed Feb. 20, 2020 from https://www.sunflowernsa.com/wholeseed/, 1 page.

Sunflower as a Feed, National Sunflower Association, accessed Feb. 20, 2020 from https://www.sunflowernsa.com/wholeseed/sunflower-as-a-feed/, 6 pages.

Sunflower Protein, AURI, Agricultural Utilization Research Institute, 2018, 2 pages.

Wldermuth, et al., "Chlorogenic Acid Oxidation and Its Reaction with Sunflower Proteins to Form Green-Colored Complexes", Comprehensive Reviews in Food Science and Food Safety, 2016, vol. 15, pp. 829-843.

ABC about Planetarians, video aired Mar. 19, 2018, KSTP-TV, Minneapolis, MN, accessed from https://www.youtube.com/watch?v=5df9_0Wnjl&feature=youtu.be.

(56) References Cited

OTHER PUBLICATIONS

"Planetarians Aiming to Fight Childhood Obesity with Food Waste", Sustainable Brands, Nov. 16, 2017, accessed from https://sustainablebrands.com/read/waste-not/planetarians-aiming-to-fight-childhood-obesity-with-food-waste, 5 pages.

Stone, Dawna, "Do Planetarians Sunflower Chips Have More Protein Than Beef?!", Bold Business, Feb. 27, 2018, accessed from https://www.boldbusiness.com/nutrition/planetarians-sunflower-chips-more-protein-beef/, 6 pages.

Feeding the Future, Successful Farming, Sep. 17, 2019, accessed from https://www.agriculture.com/news/business/feeding-the-future, 9 pages.

Today's Dietician, Great Valley Publishing Company, Inc., May 2018, vol. 20, No. 5, 69 pages.

Planetarians: "Animal Agriculture Cannot Feed the World", Oct. 26, 2018, vegconomist, accessed from https://vegconomist.com/interviews/planetarians-animal-agriculture-cannot-feed-the-world/, 8 pages.

Burwood-Taylor, Louisa, 2019 AgFunder AgriFood Tech Innovation Awards Winners Announced, AgFunder Network Partners, Mar. 21, 2019, accessed from https://agfundernews.com/2019-agfunder-innovation-awards-winners-announced.html, 4 pages.

Planerarians Sunflower Chips, National Sunflower Association, Dec. 1, 2018, accessed from https://www.sunflowernsa.com/magazine/articles/default.aspx?ArticieID=3822, 4 pages.

Askew, Katy, "Planetarians ties-up with Barilla, Amadori to innovate with up-cycled sunflower flour", Mar. 19, 2019, FoodNavigator.com, accessed from https://www.foodnavigator.com/Article/2019/03/19/Planetarians-ties-up-with-Barilla-Amadori-to-innovate-with-up-cycled-sunflower-flour?utm_source=copyright&utm_medium=OnSite&utm_campaign=copyright, 5 pages.

Murray, Sarah, "Accelerators speed development of promising food start-ups", Financial Times, Mar. 11, 2019, accessed from https://www.ft.com/content/778c9f5e-294e-11e9-9222-7024d72222bc, 4 pages.

Peters, Adele, "Everything you need to know about the booming business of fighting food waste", Jun. 19, 2019, accessed from https://www.fastcompany.com/90337075/inside-the-booming-business-of-fighting-food-waste, 7 pages.

Leinonen et al., "Lysine Supply Is a Critical Factor in Achieving Sustainable Globai Protein Economy", Frontiers in Sustainable Food Systems, Apr. 2019, vol. 3, Article 27, 11 pages.

Ajandouz, et al., "Nonenzymatic Browning Reaction of Essential Amino Acids: Effect of pH on Caramelization and Maillard Reaction Kinetics", J. Agric. Food Chem. 1999, 47, 5, 1786-1793 English abstract only.

Lin et al., Extrusion Process Parameters, Sensory Characteristics, and Structural Properties of a High Moisture Soy Protein Meat Analog, Journal of Food Science, vol. 60, No. 3, 2002, pp. 1066-1072.

Solae™ Product Standard, Supro® 320, Isolated Soy Protein, Version: 1.0 Issue Date Apr. 2, 2010, 4 pages.

Uriman Grain Product Specification Sheet for Non-GMO U.S. Soybean Meal, Select 5CF, Dec. 7, 2010, 1 page.

International Feed, Sunflower Seed Meal Product Sheet, Feb. 17, 2015, 1 page.

Sotillo et al., Corn Meal-Sunflower Meal Extrudates and Their Physicochemical Properties, Journal of Food Science, vol. 59, No. 2, 1994, pp. 432-435.

Yue et al., Native and Succinylated Sunflower Proteins Use in Bread Baking, Journal of Food Science, vol. 56, No. 4, 1991, pp. 992-995.

Reddy et al., Supplementation of Wheat Muffins with Dried Distillers Grain Flour, Journal of Food Quality, 9, 1986, pp. 243-249.

Arepa with Soy, Mintel, Record ID 6281913, Jan. 25, 2019, http://www.gnpd.com, 2 pages.

International Search Report and Written Opinion of the International Searching Authority for International Application No. PCT/US2020/052385 dated Dec. 7, 2020.

* cited by examiner

METHOD FOR MANUFACTURING ALTERNATIVE MEAT FROM LIQUID SPENT BREWERS' YEAST

CROSS-REFERENCE TO RELATED APPLICATIONS

This present application is a continuation of U.S. patent application Ser. No. 17/474,075 filed on Sep. 14, 2021, which application claims the benefit of U.S. Provisional Patent Application No. 63/221,755 filed on Jul. 14, 2021, the contents of which are incorporated by reference into this specification. This application also claims the benefit of U.S. Provisional Patent Application No. 63/221,755, filed on Jul. 14, 2021, the contents of which are incorporated by reference into this specification.

FIELD

The present disclosure relates to methods of manufacturing alternative meats from liquid spent brewer's yeast (SBY) by high moisture extrusion cooking.

BACKGROUND

Spent brewer's yeast is a by-product of the brewing industry. The spent yeast cells are removed at the end of the bulk fermentation. A small amount of it is used to start the next batch of fermentation, the remaining part of the spent yeast is discarded. This discarded yeast is high in nutrients, in particular proteins, vitamins, and minerals, as well as containing functional and biologically active compounds such as polyphenols, antioxidants, β-glucans and mannoproteins.

Side effects concerns of high levels of yeast feeding on uric acid metabolism of young men, expressed by J. C. Edozien et al in Nature vol 228, 1970 set safe limits of Ribonucleic acid (RNA) for human diet at 2 g per day. Spent brewer's yeast contains about 10-15% of RNA. Such a high content limits SBY-based protein consumption down to 13-20 g per day, which is hard to manage given 50 g FDA recommended allowances for protein based on a 2,000 calorie daily diet and 60 g per day average protein consumption from red meat, poultry, and fish (boneless weight) in the US.

Known chemical, enzymatic, and heat treatment methods of reducing RNA content in SBY still leave the consumption of SBY-based protein at risk. Because of the high RNA content, the use of spent brewer's yeast for human applications is limited to debittered, dried, or autolyzed flavor-enhancing extracts with up to 2% inclusion in the food products.

Currently, the majority of the liquid spent brewers' yeast is composted or used as animal feed. Animal agriculture contributes to climate change with greenhouse gas emissions, new methods of processing for direct human consumption are required.

SUMMARY

Method of manufacturing food products from a material comprising liquid spent brewers yeast is provided herein. A method for processing liquid spent brewers' yeast as the primary ingredient and at least one secondary protein ingredient into food products suitable for safe human consumption comprises subjecting a mix of primary and secondary ingredients to heat treatment at elevated pressure. The resulting product has a meaty flavor and texture, and a reduced RNA content. The process uses ingredients in their native liquid form, skipping drying and isolation, which reduces waste and is cost-effective.

It is understood that the inventions disclosed and described in this specification are not limited to the aspects summarized in this Summary. The reader will appreciate the foregoing details, as well as others, upon considering the following detailed description of various non-limiting and non-exhaustive aspects according to this disclosure.

BRIEF DESCRIPTION OF THE DRAWINGS

The features and advantages of the examples, and the manner of attaining them, will become more apparent, and the examples will be better understood, by reference to the following description of embodiments taken in conjunction with the accompanying drawings, wherein.

Figure 1:
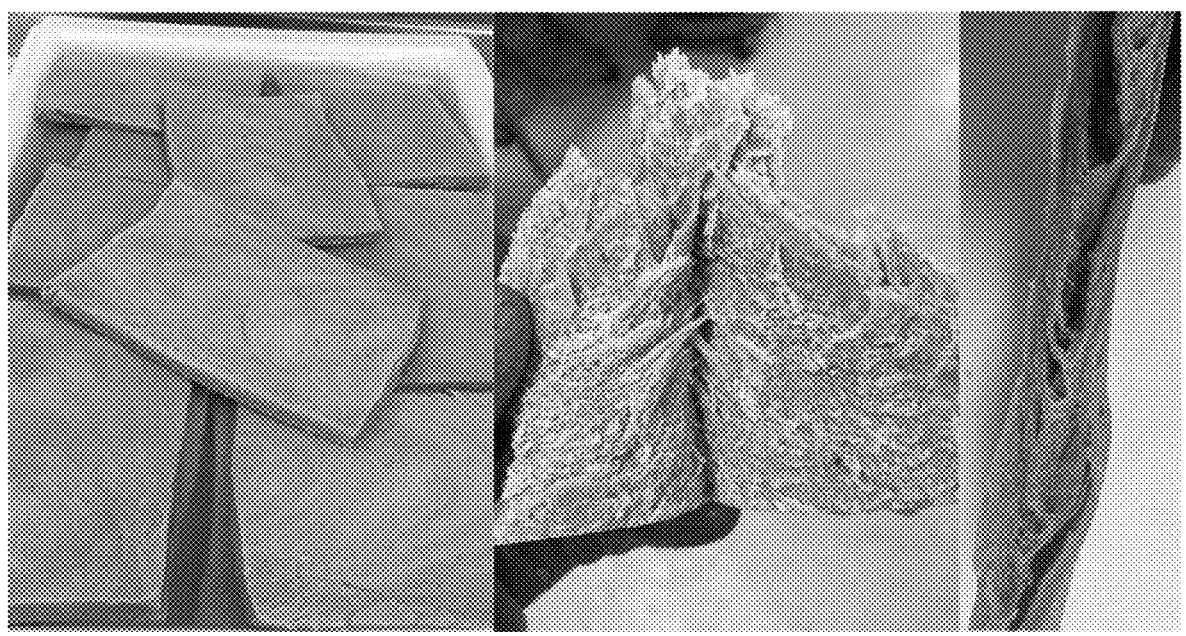
FIG. 1 is a meat-like product with a muscle-like texture made according to Example #1.

The exemplifications set out herein illustrate certain embodiments, in one form, and such exemplifications are not to be construed as limiting the scope of the appended claims in any manner.

DETAILED DESCRIPTION OF NON-LIMITING EMBODIMENTS

Various examples are described and illustrated herein to provide an overall understanding of the structure, function, and use of the disclosed methods, systems, compositions, and products. The various examples described and illustrated herein are non-limiting and non-exhaustive. Thus, the invention is not limited by the description of the various non-limiting and non-exhaustive examples disclosed herein. Rather, the invention is defined solely by the claims. The features and characteristics illustrated and/or described in connection with various examples may be combined with the features and characteristics of other examples. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. The various examples disclosed and described in this specification can comprise, consist of, or consist essentially of the features and characteristics as variously described herein.

Any patent, publication, or other disclosure material identified herein is incorporated herein by reference in its entirety unless otherwise indicated but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout the specification to "various examples," "some examples," "one example," or "an example", or the like, means that a particular feature, structure, or characteristic described in connection with the example is included in at least one example. Thus, appearances of the phrases "in various examples," "in some examples," "in one example", or "in an example", or the like, in places throughout the specification are not necessarily all referring to the same example. Furthermore, the particular features, structures, or characteristics may be combined in any suitable manner in one or more examples. Thus, the particular features, structures, or characteristics illustrated or described in connection with one example may be combined, in whole or in part, with the features structures, or characteristics of one or more other examples without limitation. Such modifications and variations are intended to be included within the scope of the present examples.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

All ranges recited herein are inclusive of the endpoints of the recited ranges. For example, a range of "1 to 10" includes the endpoints 1 and 10. Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

The grammatical articles "a," "an," and "the," as used herein, are intended to include "at least one" or "one or more," unless otherwise indicated, even if "at least one" or "one or more" is expressly used in certain instances. Thus, the foregoing grammatical articles are used herein to refer to one or more than one (i.e., to "at least one") of the particular identified elements. Further, the use of a singular noun includes the plural, and the use of a plural noun includes the singular, unless the context of the usage requires otherwise.

In this specification, unless otherwise indicated, all percentages (e.g., weight percent protein, percent protein, percent moisture) are to be understood as being based on weight.

A method of making alternative meat is disclosed herein. The method includes high moisture extrusion cooking of about 60% to 80% by weight liquid spent brewers yeast with about 20% to 40% by weight vegetable protein at 150 C temperature, 20 bar pressure for 2 minutes. The resulting product has a meat-like appearance and palatability, 23.3% by weight protein, and just 0.09% RNA by weight.

The invention allows safely eating more than 10 times the FDA recommended daily amount of protein, which is equivalent to more than 2 kg of animal meat, which is 8.96 times higher than average daily meat consumption from red meat, poultry, and fish (boneless weight) in the US according to USDA.

The use of spent brewers yeast in its liquid form reduces costs for debittering and drying. The use of vegetable proteins in their native form reduces costs for extraction and by-products utilization. The naturally occurring meaty flavor and BBQ-like color reduce costs for secondary ingredients such as maskers, bitter blockers, flavors, and colors resulting in costs cheaper than animal meat.

TABLE 1

Methods for RNA reduction for increased SBY-based protein consumption

|  | Spent brewers' yeast untreated | Enzymatic hydrolysis Marson, 2020 | Phosphate solution, heat shock, dialysis or washing Canepa, 1972 | Alkaline Hydrolysis and heat treatment, Trevelyan, 1976 | Current invention, mix of 70% liquid SBY and 30% Soybean meal | Upper safe level of RNA per day, g |
|---|---|---|---|---|---|---|
| RNA level, % | 10.00-15.00 |  |  |  |  |  |
| RNA level for 50 g protein (according to FDA RDA basedon 2000 cal diet), g |  | 3.33-5.00 | 1.67-2.00 | 0.57-2.39 | 0.19 | <2 |
| RNA level for 60 g protein (average amount of protein consumed from red meat, poultry, and fish (boneless weight) in the US), g |  | 4.00-6.00 | 2.00-2.40 | 0.68-2.87 | 0.22 | <2 |
| Safe amount of protein for daily consumption based on RNA content, g |  | 20.00-30.03 | 50.00-59.88 | 41.84-175.44 | 537.69 |  |

TABLE 1-continued

Methods for RNA reduction for increased SBY-based protein consumption

| | Spent brewers' yeast untreated | Enzymatic hydrolysis Marson, 2020 | Phosphate solution, heat shock, dialysis or washing Canepa, 1972 | Alkaline Hydrolysis and heat treatment, Trevelyan, 1976 | Current invention, mix of 70% liquid SBY and 30% Soybean meal | Upper safe level of RNA per day, g |
|---|---|---|---|---|---|---|
| Maximum amount of meat to eat safely per day (based on animal equivalent containing 26 g protein per 100 g), kg | | 0.08-0.12 | 0.19-0.23 | 0.16-0.67 | 2.07 | |

Optimizing processing parameters for different combinations of primary and secondary ingredients in some embodiments of the present invention, extrusion temperature may vary from 90 C to 180 C, pressure in the extruder barrel may vary from 8 bar to 150 bar, rotation may vary from 250 to 1800 RPM, the processing time may vary from 1 to 5 minutes, preferably 2 minutes.

Spent brewers' yeast can be paired with multiple protein sources. In some embodiments, the primary ingredient is chosen from spent distillers' yeast, liquid bakers' yeast, liquid nutritional yeast, or surplus yeast from ethanol manufacturing. In some embodiments, the primary ingredient is derived from various strains of Saccharomycetes class, such as *Saccharomyces cerevisiae, Saccharomyces pastorianus, Saccharomyces carlsbergensis*, etc. In some embodiments, the primary ingredient can be obtained by mixing dry spent brewers yeast and liquid, resulting in about 10-40% solids. In some embodiments, the primary ingredient can be debittered, autolyzed, or hydrolyzed.

In some embodiments, the secondary protein ingredient is chosen from vegetable protein in its native, concentrated or isolated form, microbial protein, fungal protein, animal protein, cultured protein, or a combination thereof. In some embodiments, the secondary protein ingredient may contain fat, carbohydrate, flavor, color, or a combination thereof. In some embodiments, the ingredients may contain 1-15% Fat, 0.5-2% dry weight Calcium Chloride, 0.5-1.5% dry weight gums (such as Sodium Alginate), 0.2-0.6% dry weight Lecithin.

Varying the ratio of spent brewer's yeast and secondary protein ingredients results in products with different textures. The higher the ratio of the liquid spent brewers' yeast—the more moist food product—similar to animal meat (high moisture meat analog). Reducing the spent brewer's yeast content down to 20-40%, and increasing the secondary protein content up to 60-80% results in a drier food product, similar to textured vegetable protein.

In various examples, the product can comprise 80% of the liquid spent brewers' yeast and 20% secondary protein ingredients. In various examples, the product can comprise 70% of the liquid spent brewers' yeast and 30% secondary protein ingredients. In various examples, the product can comprise 60% of the liquid spent brewers' yeast and 40% secondary protein ingredients. In various examples, the product can comprise 50% of the liquid spent brewers' yeast and 50% secondary protein ingredients. In various examples, the product can comprise 40% of the liquid spent brewers' yeast and 60% secondary protein ingredients. In various examples, the product can comprise 30% of the liquid spent brewers' yeast and 70% secondary protein ingredients. In various examples, the product can comprise 20% of the liquid spent brewers' yeast and 80% secondary protein ingredients.

Given different serving sizes set for different food products in some embodiments, the RNA content in the food product is easier to calculate as less than 4% of the food product's protein dry weight. In some embodiments, the RNA content in the food product is better to calculate as less than 2 g per serving.

EXAMPLES

The present disclosure will be more fully understood by reference to the following examples, which provide illustrative non-limiting aspects of the invention. It is understood that the invention described in this specification is not necessarily limited to the examples described in this section.

Example 1—Liquid Spent Brewers' Yeast and Soybean Meal

70% by weight of liquid brewers' spent yeast containing 20% solids were mixed with 30% by weight Soybean meal containing 50% protein and subjected to high moisture extrusion cooking at a temperature 150 C, pressure 20 bar, RPM 400 for 2 minutes.

The resulting product had 57.8% Moisture content, 23.3% protein, and 0.089% RNA. The protein content was measured according to AACC 46-30 and AOAC 992.15. RNA extraction was performed, and the residual RNA percentage was calculated based on the RNA concentration. The resulting product had a meaty flavor and a muscle-like fibrous texture as shown in FIG. 1.

Example 2—Liquid Spent Brewers' Yeast and Yellow Pea

40% by weight of liquid Brewers spent yeast containing 20% solids were mixed with 60% by weight Yellow pea containing 24% protein and subjected to extrusion cooking at a temperature 130 C, pressure 10 bar, RPM 400 for 1 minute.

Figure 2:
FIG. 2 is a textured product similar to vegetable bacon bits made according to Example #2.

The resulting product had 36.2% moisture content, 18.4% protein and 0.094% RNA. The protein content was measured according to AACC 46-30 and AOAC 992.15. RNA extraction was performed, and the residual RNA percentage was calculated based on the RNA concentration. The resulting product had a meaty flavor and fibrous texture similar to vegetable bacon bits in FIG. 2.

One skilled in the art will recognize that the herein described methods, processes, systems, apparatus, components, devices, operations/actions, and objects, and the discussion accompanying them, are used as examples for the sake of conceptual clarity and that various configuration modifications are contemplated. Consequently, as used herein, the specific examples/embodiments set forth and the accompanying discussions are intended to be representative of their more general classes. In general, use of any specific exemplar is intended to be representative of its class, and the non-inclusion of specific components, devices, operations/actions, and objects should not be taken as limiting. While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed, and not as more narrowly defined by particular illustrative aspects provided herein.

REFERENCES

1. Dietary Guidelines for Americans, Ninth edition, 2020 https://www.dietaryguidelines.gov
2. USDA Food Availability (Per Capita) Data System, 2021 https://www.ers.usda.gov/data-products/food-availability-per-capita-data-system/
3. J. C. Edozien et al. Effects of high levels of yeast feeding on uric acid metabolism of young men. Nature vol 228, 1970
4. Marson, G. V.; Saturno, R. P.; Comunian, T. A.; Consoli, L.; Machado, M. T. D. C.; Hubinger, M. D. Maillard conjugates from spent brewer's yeast by-product as an innovative encapsulating material. Food Res. Int. 2020, 136, 109365.
5. Canepa, A.; Pieber, M.; Romero, C.; Tohá, J. C. A method for large reduction of the nucleic acid content of yeast. Biotechnol. Bioeng. 1972, 14, 173-177.
6. Trevelyan, W. E. Chemical methods for the reduction of the purine content of baker's yeast, a form of single-cell protein. J. Sci. Food Agric. 1976, 27, 225-230.

What is claimed is:

1. A method of processing liquid yeast into an alternative meat suitable for human consumption, the method comprising:
    extruding a mix comprising a liquid yeast and a secondary protein ingredient at a temperature of at least 90 degrees Celsius and at an elevated pressure of at least 8 bar to form the alternative meat, wherein the mix comprises a range of 40% to 80%, inclusively, of the liquid yeast based on the total weight of the mix and a ribonucleic acid content in the alternative meat is less than 4% of the dry protein weight of the alternative meat.

2. The method of claim 1 wherein the temperature varies and is at least 90 degrees Celsius, but no greater than 180 degrees Celsius, and wherein the elevated pressure varies and is at least 8 bar, but no greater than 150 bar, and wherein the temperature and elevated pressure are applied together for at least 1 minute and no longer than 5 minutes.

3. The method of claim 1 wherein the liquid yeast is between 60 and 80%, inclusively, by weight based upon the total weight of the mix.

4. The method of claim 1 wherein the liquid yeast is between 40 and 70%, inclusively, by weight based upon the total weight of the mix.

5. The method of claim 1 wherein the liquid yeast is between 40 and 60%, inclusively, by weight based upon the total weight of the mix.

6. The method of claim 1 wherein the secondary protein ingredient is between 20 and 40%, inclusively, by weight based upon the total weight of the mix.

7. The method of claim 1 wherein the liquid yeast comprises spent brewers' yeast, spent distillers' yeast, bakers' yeast, nutritional yeast, or surplus yeast from ethanol manufacturing.

8. The method of claim 1 wherein the liquid yeast is obtained by mixing dry yeast with a liquid.

9. The method of claim 1, wherein the secondary protein ingredient comprises vegetable protein, microbial protein, fungal protein, animal protein, cultured protein in their native, concentrated, or isolated form, or a combination thereof.

10. The method of claim 1 wherein the yeast in the liquid yeast is one or more of debittered, autolyzed, or hydrolyzed.

11. A method of processing yeast into an alternative meat suitable for human consumption, the method comprising:
    extruding a mix comprising brewers' yeast and a secondary protein ingredient at a temperature of at least 90 degrees but less than 180 degrees Celsius and at an elevated pressure of at least 8 bar but no greater than 150 bar to form the alternative meat, wherein the mix comprises a range of 40% to 80%, inclusively, of the brewers' yeast based on the total weight of the mix and a ribonucleic acid content in the alternative meat is less than 4% of the dry protein weight of the alternative meat.

12. The method of claim 11 wherein the secondary protein ingredient comprises vegetable protein, microbial protein, fungal protein, animal protein, or cultured protein, and wherein the secondary protein ingredient is in a native, concentrated, or isolated form, or a combination thereof.

13. The method of claim 11 wherein the liquid yeast is between 60 and 80%, inclusively, by weight based upon the total weight of the mix.

14. The method of claim 11 wherein the liquid yeast is between 40 and 70%, inclusively, by weight based upon the total weight of the mix.

* * * * *